(12) United States Patent
Mollov

(10) Patent No.: US 8,878,137 B2
(45) Date of Patent: Nov. 4, 2014

(54) PHOTO DETECTOR OF AN X-RAY IMAGER

(75) Inventor: Ivan P. Mollov, Mountain View, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 447 days.

(21) Appl. No.: 13/273,193

(22) Filed: Oct. 13, 2011

(65) Prior Publication Data
US 2013/0092845 A1 Apr. 18, 2013

(51) Int. Cl.
*H01L 27/146* (2006.01)
*G01T 1/24* (2006.01)

(52) U.S. Cl.
CPC ........................................ *G01T 1/24* (2013.01)
USPC .................................................. 250/370.09

(58) Field of Classification Search
USPC .................................................. 250/370.09
See application file for complete search history.

(56) References Cited

U.S. PATENT DOCUMENTS

| | | | |
|---|---|---|---|
| 3,453,141 A * | 7/1969 | Monteleone et al. | ........... 430/84 |
| 6,403,965 B1 | 6/2002 | Ikeda et al. | |
| 6,507,026 B2 | 1/2003 | Ikeda et al. | |
| 6,740,884 B2 | 5/2004 | Lee et al. | |
| 7,208,810 B2 | 4/2007 | Wright | |
| 7,507,512 B2 | 3/2009 | Yanoff et al. | |
| 2002/0036267 A1 | 3/2002 | Ikeda et al. | |
| 2008/0094378 A1 | 4/2008 | Mollov | |

OTHER PUBLICATIONS

Notification of Transmittal of the International Search Report and the Written Opinion of the International Searching Authority, Jan. 4, 2013.

* cited by examiner

*Primary Examiner* — Marcus Taningco
*Assistant Examiner* — Mindy Vu
(74) *Attorney, Agent, or Firm* — SU IP Consulting

(57) ABSTRACT

An X-ray imager includes a photo detector, a pixel array, a scan line and a data line. The photo detector includes a plurality of X-ray sensitive particles that are configured to be electrically isolating and to generate charge carriers upon absorption of X-ray photons. In one example embodiment, the photo detector includes a layer of an electrically isolating material, within which the plurality of X-ray sensitive particles are distributed. The pixel array includes multiple pixels each defined by a space between a first surface and a second surface of the layer. The scan line is configured to activate a corresponding row of the pixels in the pixel array. The data line is configured to read data from a corresponding column of the pixels in the pixel array.

21 Claims, 16 Drawing Sheets

PHOTO DETECTOR OF AN X-RAY IMAGER

BACKGROUND

Unless otherwise indicated herein, the approaches described in this section are not prior art to the claims in this application and are not admitted to be prior art by inclusion in this section.

A particle-in-binder (PIB) detector is used in an X-ray imager for converting X-ray into electrical signals. In a traditional PIB detector, X-ray sensitive particles are distributed in a charge transporting binder, which is sandwiched between two electrodes. Upon impingement of X-ray photons, the X-ray sensitive particles generate charge carriers (i.e., electrons and holes). The two electrodes are biased in order to create an external field, which draws the generated electrons and holes toward opposite sides of the PIB detector. After collecting the electrical charges accumulated on the electrodes, corresponding images associated with the X-ray exposure may be generated.

One major drawback of the traditional PIB detector is its unstable charge transfer characteristics at the interface between the surfaces of the X-ray sensitive particles and the charge transporting binder. Due to variations in temperature, impurities or moisture during manufacturing processes, the X-ray sensitive particles may trap varying amount of charge carriers at the surfaces. Depending on the location of an X-ray sensitive particle, a charge carrier generated by the X-ray sensitive particle may travel a long distance or a short distance before reaching one side of the PIB detector. These varying charge transfer characteristics and carrier drift distances may limit the conversion efficiency of the X-ray imager.

SUMMARY

In at least some embodiments of the present disclosure, an X-ray imager includes a photo detector, a pixel array, a scan line and a data line. The photo detector includes a plurality of X-ray sensitive particles that are configured to be electrically isolated and to generate charge carriers upon absorption of X-ray photons. In one example embodiment, the photo detector includes a layer of an electrically isolating material, within which the plurality of X-ray sensitive particles are distributed. The pixel array includes multiple pixels each defined by a space between a first surface and a second surface of the layer. The scan line is configured to activate a corresponding row of the pixels in the pixel array. The data line is configured to read data from a corresponding column of the pixels in the pixel array.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
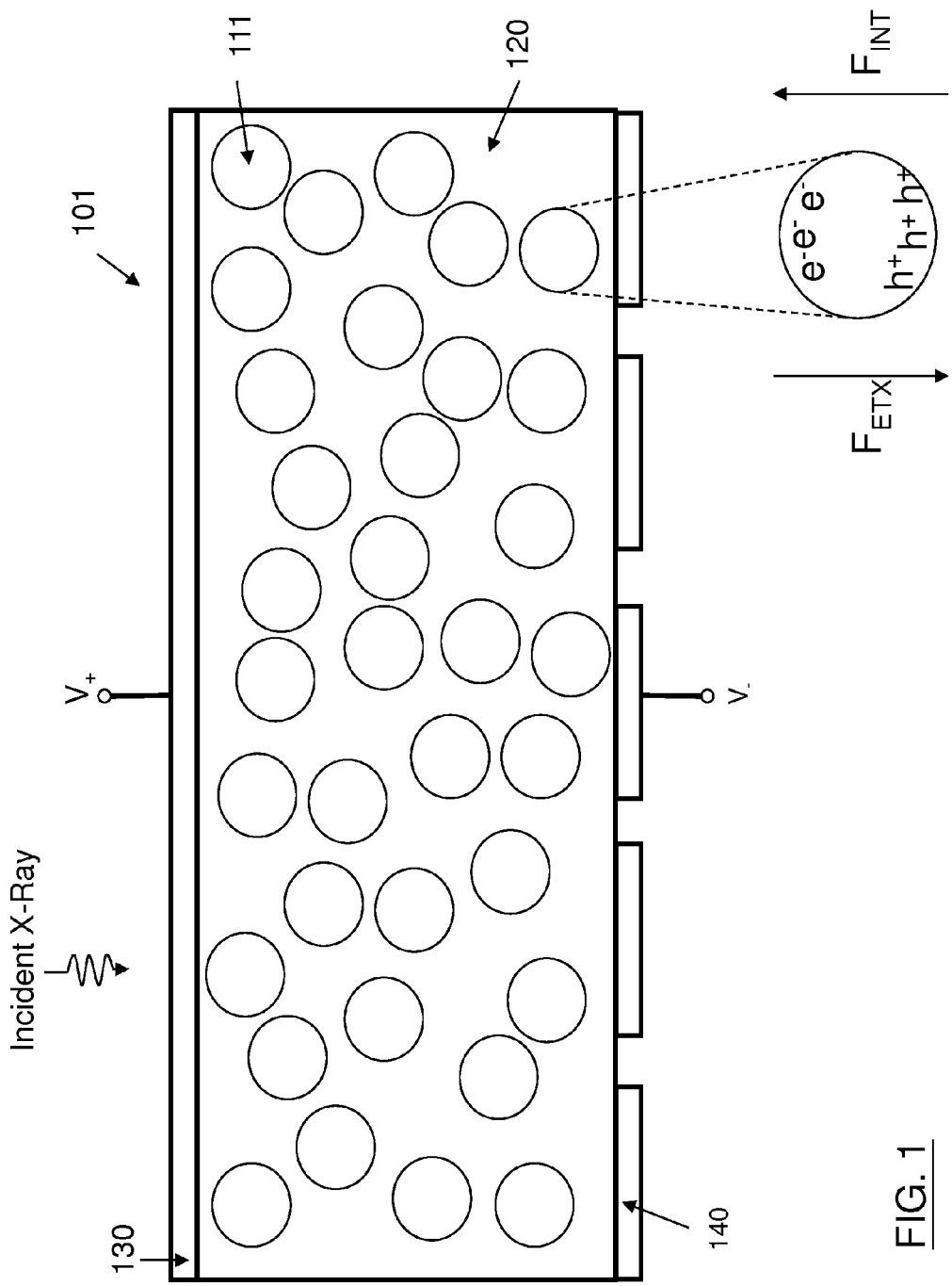
FIGS. 1-5 are illustrative embodiments of a photo detector.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an illustrative embodiment of a photo detector 101 in accordance with the present disclosure. The photo detector 101, sandwiched between a top electrode 130 and bottom electrodes 140, includes X-ray sensitive particles 111 distributed within a layer 120. Some example materials for the X-ray sensitive particles 111 include, without limitation, PbI2, CsI, NaI, HgI2, CdS, Hg2IN, PbBr2, HgBr2, HgBrN, Mn3HgN, HgI2BN, PbN2, Pb(N3)2, GaAs, CdTe, PbTe, PbO, Te, Se, Si or a mix of the above. The X-ray sensitive particles 111 normally behave as insulators but release charge carriers (electrons e– and holes h+) upon absorption of X-ray photons. In one embodiment, the X-ray sensitive particles 111 may be configured to be electrically isolated. After respectively supplying biasing voltages V+ and V– to the top electrode 130 and the bottom electrodes 140, an external electrical field $F_{EXT}$ established across the layer 120 draws the electrons e– toward the top electrode 130 and pushes the holes h+ toward the bottom electrodes 140.

In one embodiment, the layer 120 is substantially made up of an electrically isolating material, which may be, without limitation, organic/inorganic, a polymer, and/or an oxide. With the layer 120, the electrons e– and the holes h+ are generally kept within and accumulated at opposite sides of the X-ray sensitive particles 111. As a result, an internal electrical field $F_{INT}$, opposite to the external electrical field $F_{EXT}$, is created. The internal electrical field $F_{INT}$ induces displacement current which may be measured from the top electrode 130 and the bottom electrodes 140 for determining the amount of X-ray exposure. The method of reading the induced electrical signal will be described in more details in subsequent paragraphs.

Figure 2:
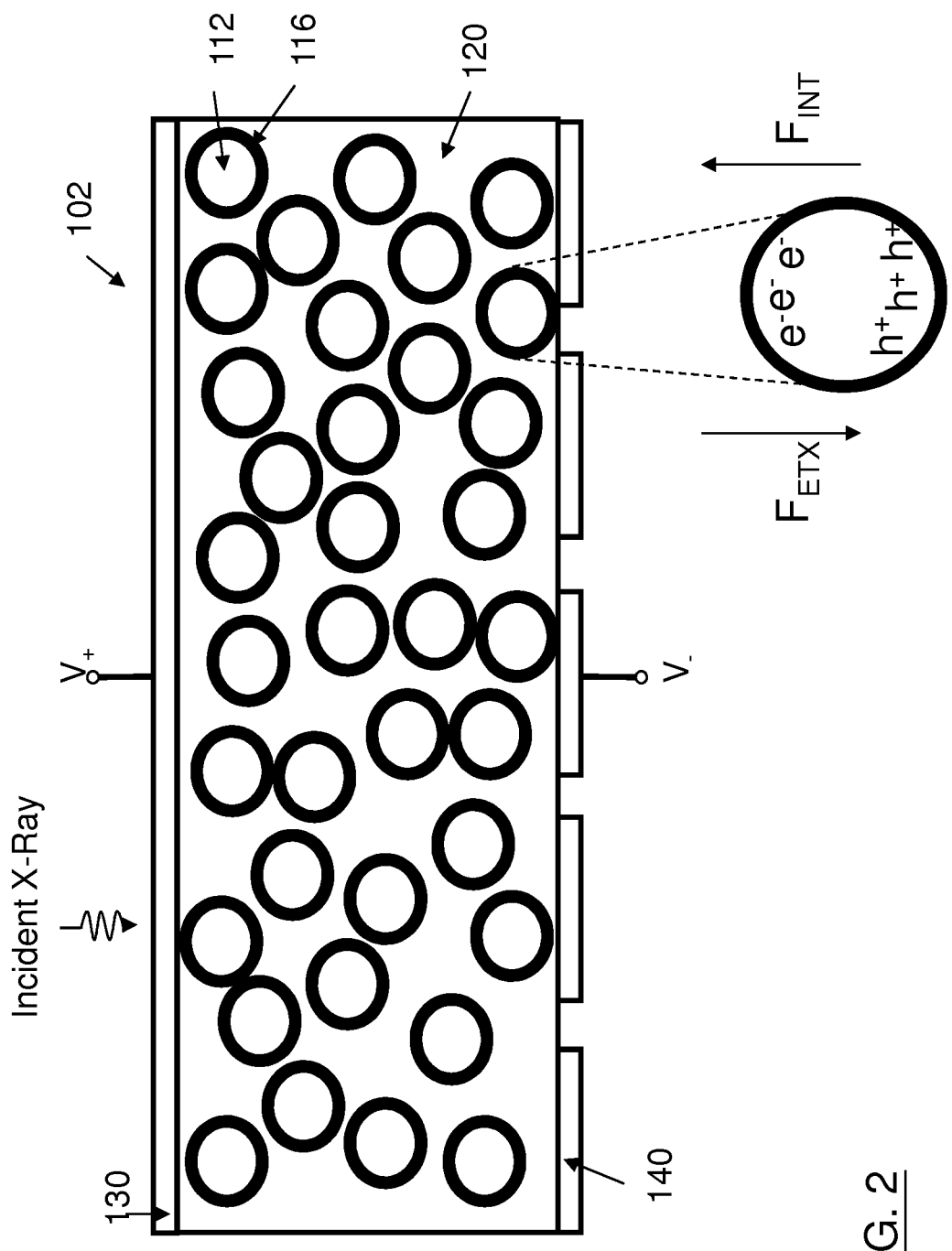

FIGS. 2-5 illustrate various embodiments of a photo detector having the similar configuration as the photo detector 101. FIG. 2 is an illustrative embodiment of a photo detector 102 in accordance with the present disclosure. The photo detector 102, also sandwiched between the top electrode 130 and the bottom electrodes 140 like the photo detector 101, includes X-ray sensitive particles 112 distributed within the layer 120. In this embodiment, each of the X-ray sensitive particles 112 is coated with an electrically isolating film 116. The electrically isolating film 116 may further confine the electrons e– and the holes h+ within the X-ray sensitive particles 112 and allow for higher particle packing density.

Figure 3:
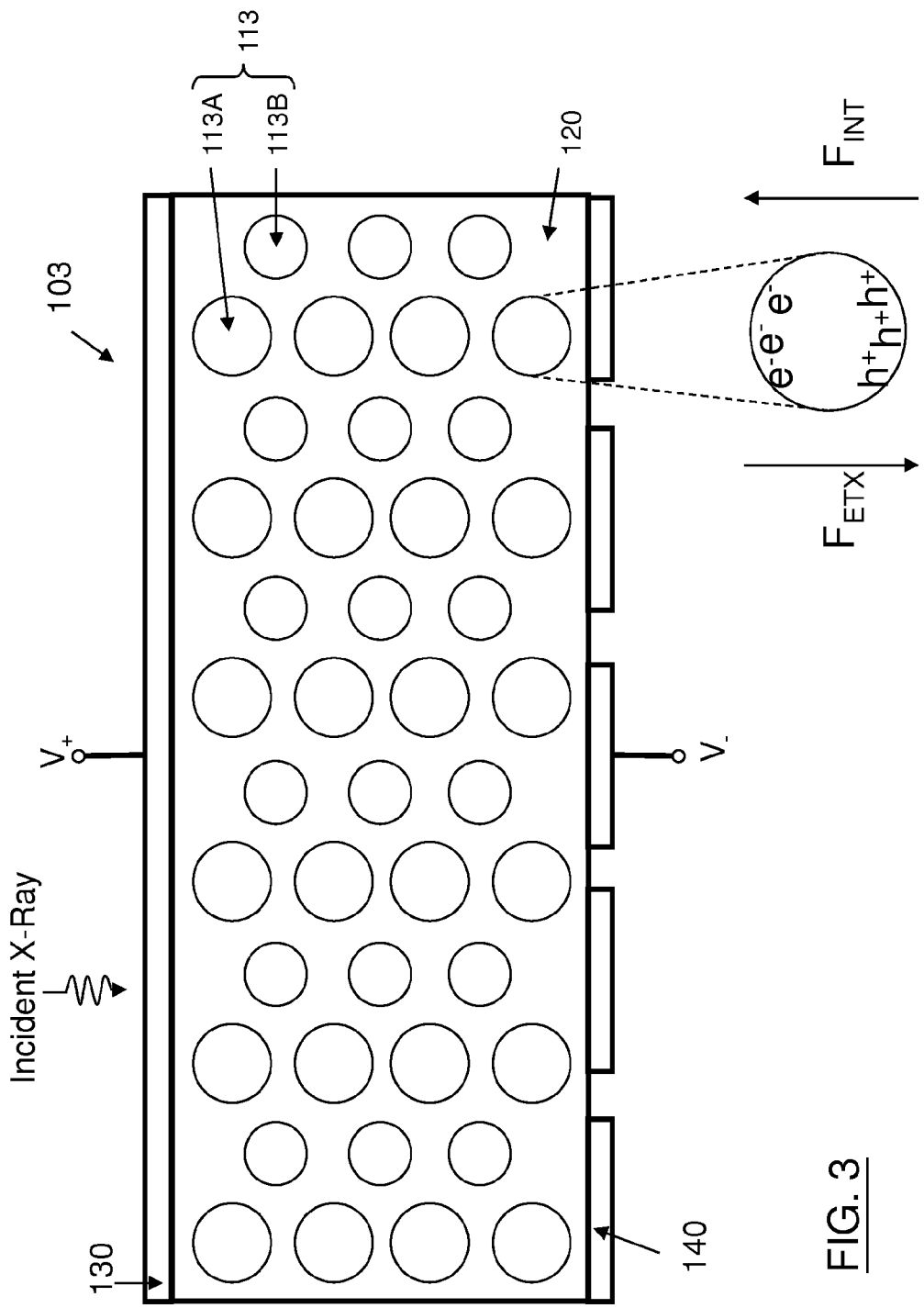

FIG. 3 is an illustrative embodiment of a photo detector 103 in accordance with the present disclosure. The photo detector 103, sandwiched between the top electrode 130 and the bottom electrodes 140, includes X-ray sensitive particles 113 distributed within the layer 120. In this embodiment, the X-ray sensitive particles 113 have varying sizes. For example, the size of an X-ray sensitive particle 113A may be larger than the size of an X-ray sensitive particle 113B. By mixing the larger X-ray sensitive particles 113A and the smaller X-ray sensitive particles 113B together as depicted in FIG. 3, the packing density of the X-ray sensitive particles 113 in the layer 120 may be further increased, which may improve X-ray absorption efficiency.

Figure 4:
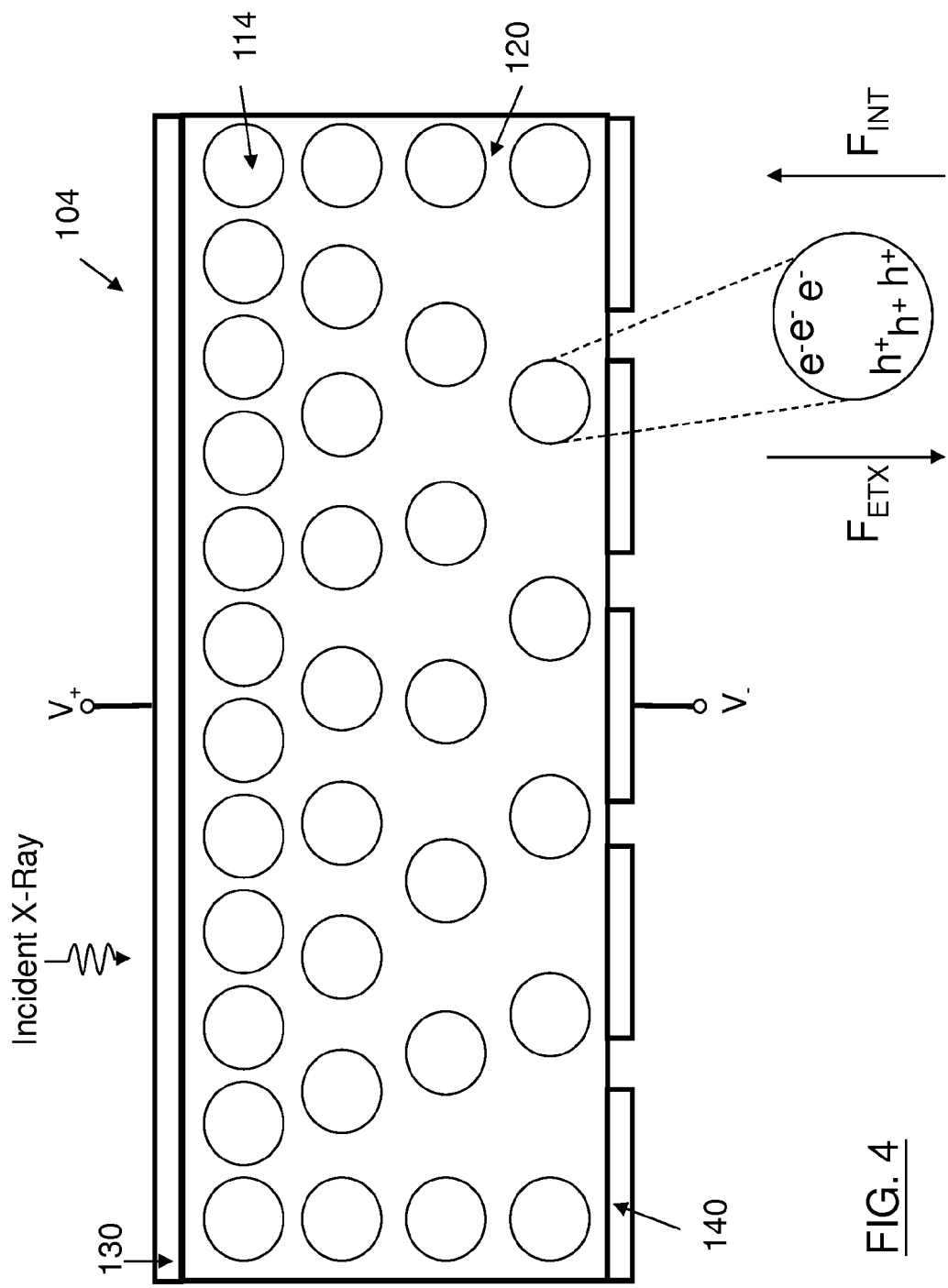

FIG. 4 is an illustrative embodiment of a photo detector 104 in accordance with the present disclosure. The photo detector 104, sandwiched between the top electrode 130 and the bottom electrodes 140, includes X-ray sensitive particles 114 distributed within the layer 120. In this embodiment, the density of the X-ray sensitive particles 114 is relatively high near the top electrode 130 (the X-ray incident surface) but gradually decreases toward the bottom electrodes 140. Since the majority of incident X-ray photons are absorbed near the incident surface of the top electrode 130, the intensity of the X-ray exponentially decreases as it travels toward the bottom electrodes 140. Therefore, by setting the density of the X-ray sensitive particles 114 higher near the top electrode 130 as shown in FIG. 4, the conversion efficiency from the X-ray into the electric charges may be increased.

Figure 5:
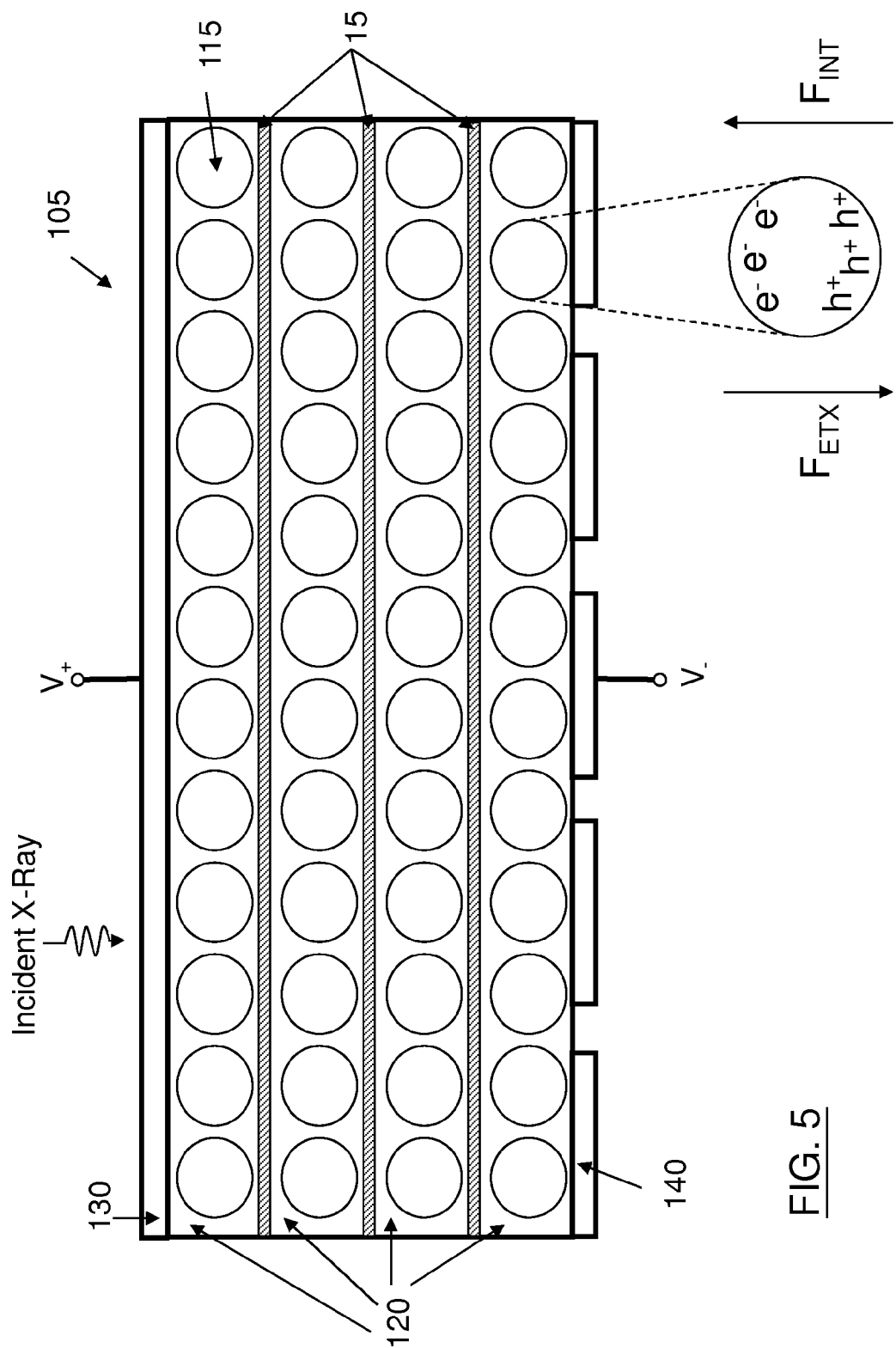

FIG. 5 is an illustrative embodiment of a photo detector 105 in accordance with the present disclosure. The photo detector 105, sandwiched between the top electrode 130 and the bottom electrodes 140, includes X-ray sensitive particles 115 distributed within the layer 120. In this embodiment, the photo detector 105 also includes an electrically isolating structure 15 to divide the layer 120 into multiple portions. The X-ray sensitive particles 115 may be disposed in these portions. By aligning the X-ray sensitive material particles 115 using the electrically isolating structure 15 as depicted in FIG. 5, the packing density of the X-ray sensitive material particles 115 in the layer 120 may be further increased, which may improve X-ray absorption efficiency.

In the embodiments illustrated in FIGS. 1-5, the layer 120 may include a binder material for binding the X-ray sensitive particles 111-115 to form a composite particle-in-isolating-binder material. However, the layer 120 may include binding, non-binding, organic, inorganic materials, or a mixture of above.

In the embodiments illustrated in FIGS. 1-5, the X-ray sensitive particles 111-115 may be pre-treated for reducing the number or concentration of charge trapping bonds on the surfaces of the X-ray sensitive particles 111-115.

In the embodiments illustrated in FIGS. 1-5, the layer 120 and the X-ray sensitive particles 111-115 may have varying dielectric constants. For instance, the dielectric constant of the layer 120 may be larger than those of the X-ray sensitive particles 111-115. Thus, larger part of the external field may be applied to the X-ray sensitive particles 111-115.

After converting X-ray signals into electrical signals using the aforementioned photo detectors 101-105, an example X-ray imager may include a select circuit and a pixel structure for data readout. The select circuit may include multiple parallel data lines and multiple parallel scan lines, which may be perpendicular to the data lines. The pixel structure may include multiple pixels, each of which may be defined by a space between the top electrode 130 and the bottom electrodes 140 at a location associated with the intersection of a corresponding data line and a corresponding scan line. In some embodiments, a pixel may further include a switching element and/or a capacitor. The select circuit may be configured to sequentially "select" each row of pixels so that the charges induced by the charge carriers generated in the X-ray sensitive particles, which are located within the selected pixels, may be transferred to and integrated by an amplifying circuit for subsequent data readout.

Figure 6:
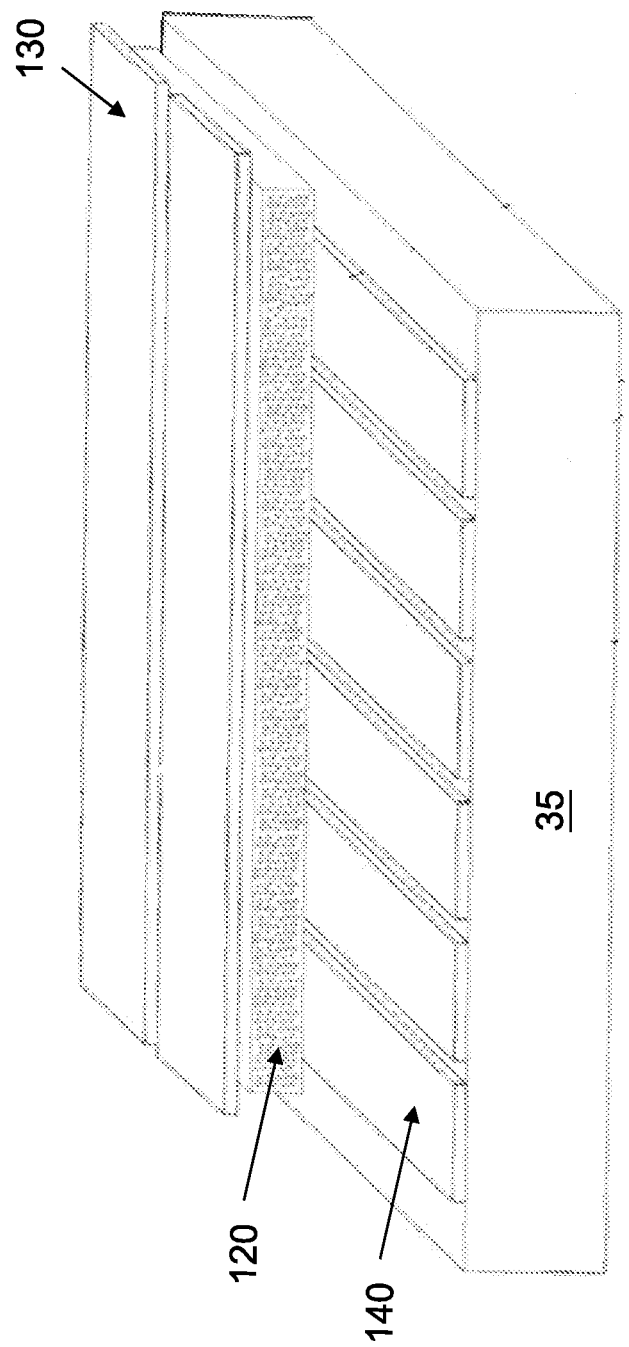
FIG. 6 is an illustrative construction of the photo detectors of FIGS. 1-5.

FIG. 6 is an illustrative construction of the photo detectors 101-105 of FIGS. 1-5. The layer 120, the top electrode 130, and the bottom electrodes 140 may be fabricated on a substrate 35 in a manner as shown in FIG. 6. In one embodiment, the top electrode 130 and the bottom electrodes 140 may be substantially orthogonal to one another.

In a first configuration of FIG. 6, the data lines may correspond to the top electrode 130, which may be disposed on one side of the layer 120, and the scan lines may correspond to the bottom electrodes 140, which may be disposed on the opposite side of the layer 120. Each pixel is defined by a space between the top electrode 130 and the bottom electrodes 140 at the intersection of a corresponding data line and a corresponding scan line. There may be an amplifying circuit for each data line.

In a second configuration, the top electrode 130 may correspond to a common electrode, and the bottom electrodes 140 may correspond to pixel electrodes. Multiple parallel data lines, multiple parallel scan lines, multiple switching elements, and/or storage capacitors may be disposed on the same side of the layer 120 as the bottom electrodes 140. Each pixel, defined by a space between the top electrode 130 and the bottom electrodes 140 at the intersection of a corresponding data line and a corresponding scan line, may include a switch and/or a capacitor. There may be an amplifying circuit for each data line.

Figure 7:
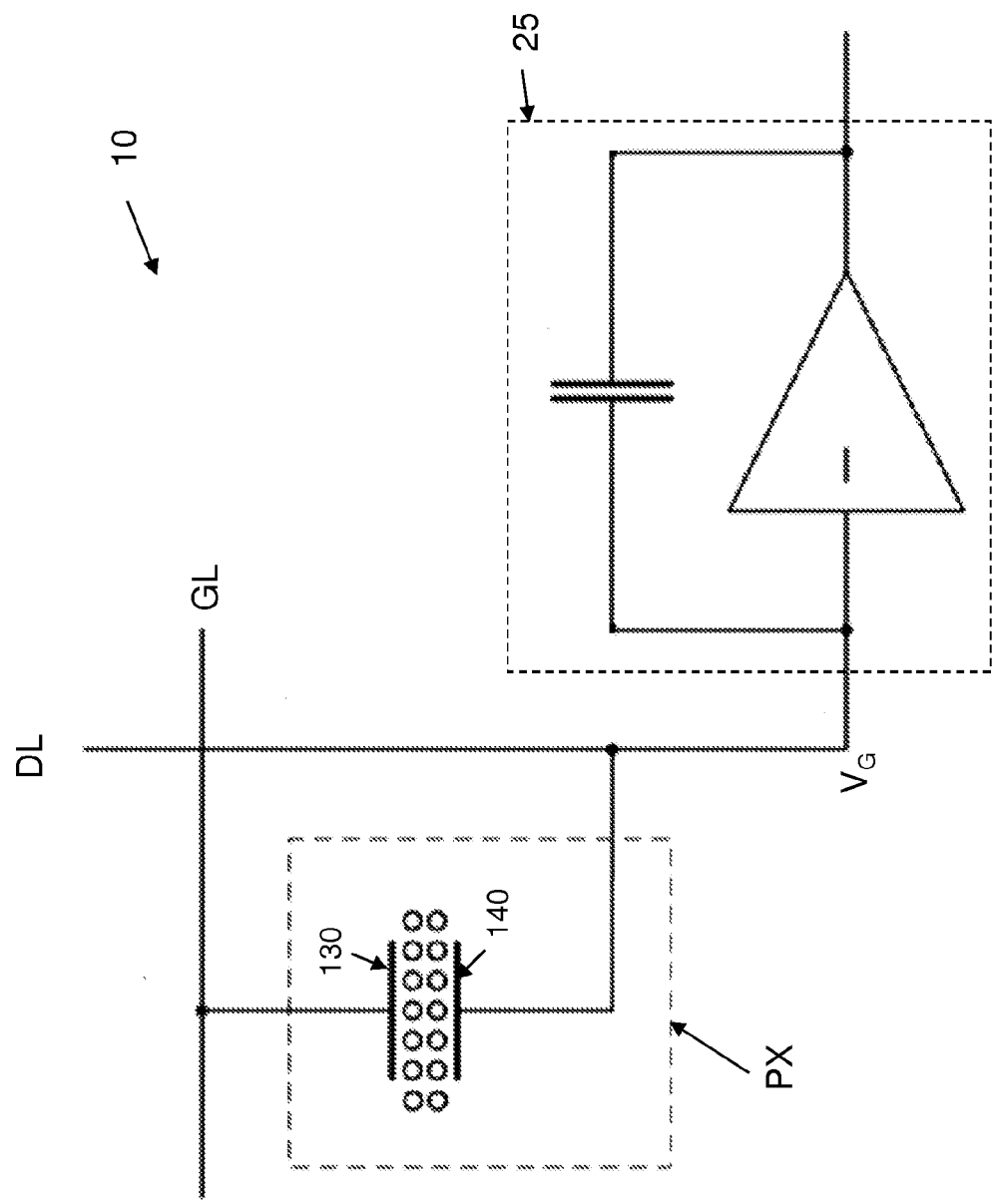
FIG. 7 is an illustrative circuit construction of an X-ray imager in a first configuration from FIG. 6.

FIG. 7 an illustrative circuit construction of an X-ray imager 10 in the aforementioned first configuration. The X-ray imager 10 may adopt any of the photo detector illustrated in FIGS. 1-5. Since all pixels of the X-ray imager 10 may share the identical structure, a single pixel PX, a corresponding data line DL, a corresponding scan line GL, and a corresponding amplifying circuit 25 are depicted in FIG. 7. Commonly denoted as "virtual ground," $V_G$ represents the input voltage level of the amplifying circuit 25. The top electrode 130 may be biased by the scan line GL. The bottom electrodes 140 may be coupled to the virtual ground $V_G$ via the data line DL. The charges induced by the charge carriers, generated within the X-ray sensitive particles of the pixel PX during an X-ray exposure, may be transferred to the amplifying circuit 25 via the data line DL when the scan line GL is selected.

FIGS. 8-11 illustrate example circuit constructions of X-ray imagers 21-24 in the aforementioned second configuration. The X-ray imagers 21-24 may adopt any of the photo detector illustrated in FIGS. 1-5. Since all pixels of the X-ray imagers 21-24 may share the identical structure, a single pixel PX, a corresponding data line DL, a corresponding scan line GL, and a corresponding amplifying circuit 25 are depicted in FIGS. 8-11. Commonly denoted as "virtual ground," $V_G$ represents the input voltage level of the amplifying circuit 25. The top electrode 130 may be biased at a common voltage $V_{COM}$.

Figure 8:
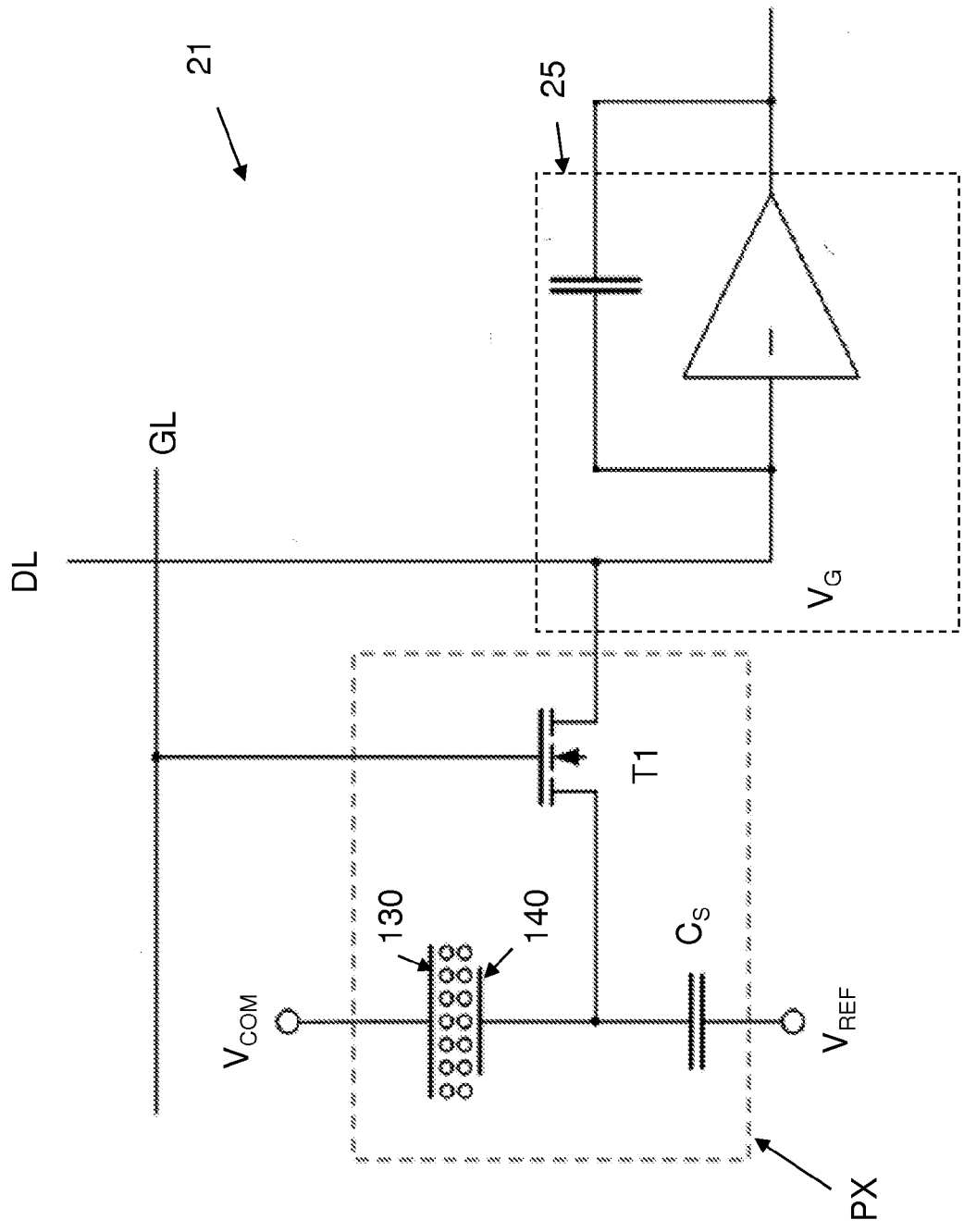
FIGS. 8-11 are illustrative circuit constructions of an X-ray imager in a second configuration.

In the X-ray imager 21 illustrated in FIG. 8, the pixel PX may include a switching element T1 and a storage capacitor $C_S$. The switching element T1 may be configured to selectively couple the bottom electrodes 140 to the virtual ground $V_G$ via the data line DL according to the voltage level of the scan line GL. The storage capacitor Cs may be coupled between the bottom electrodes 140 and a bias voltage $V_{REF}$.

The charges induced by the charge carriers, generated within the X-ray sensitive particles of the pixel PX during an X-ray exposure, may be collected by the storage capacitor Cs and transferred to the amplifying circuit 25 via the switching element T1 and the data line DL when the scan line GL is selected.

Figure 9:
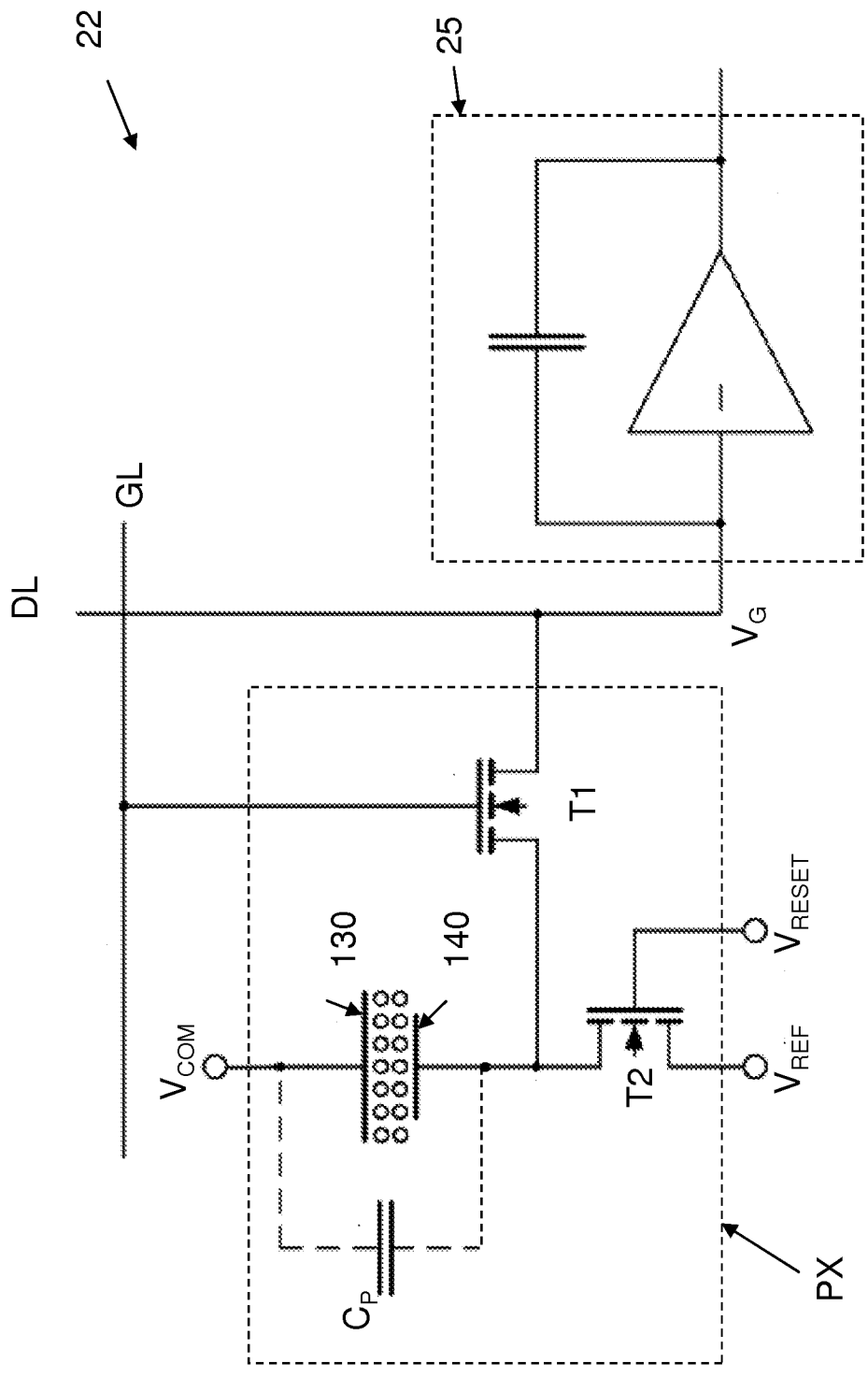

In the X-ray imager 22 illustrated in FIG. 9, the pixel PX, having a parasitic capacitance $C_P$, may include a switching element T1 and a switching element T2. The switching element T1 may be configured to selectively couple the bottom electrodes 140 to the virtual ground $V_G$ via the data line DL according to the voltage level of the scan line GL. The switching element T2 may be configured to selectively couple the bottom electrodes 140 to a bias voltage $V_{REF}$ according to a reset voltage $V_{RESET}$. The charges induced by the charge carriers, generated within the X-ray sensitive particles of the pixel PX during an X-ray exposure, may be stored in an intrinsic capacitor contributed by the parasitic capacitance $C_P$ of the pixel PX and transferred to the amplifying circuit 25 via the switching element T1 and the data line DL when the scan line GL is selected.

Figure 10:
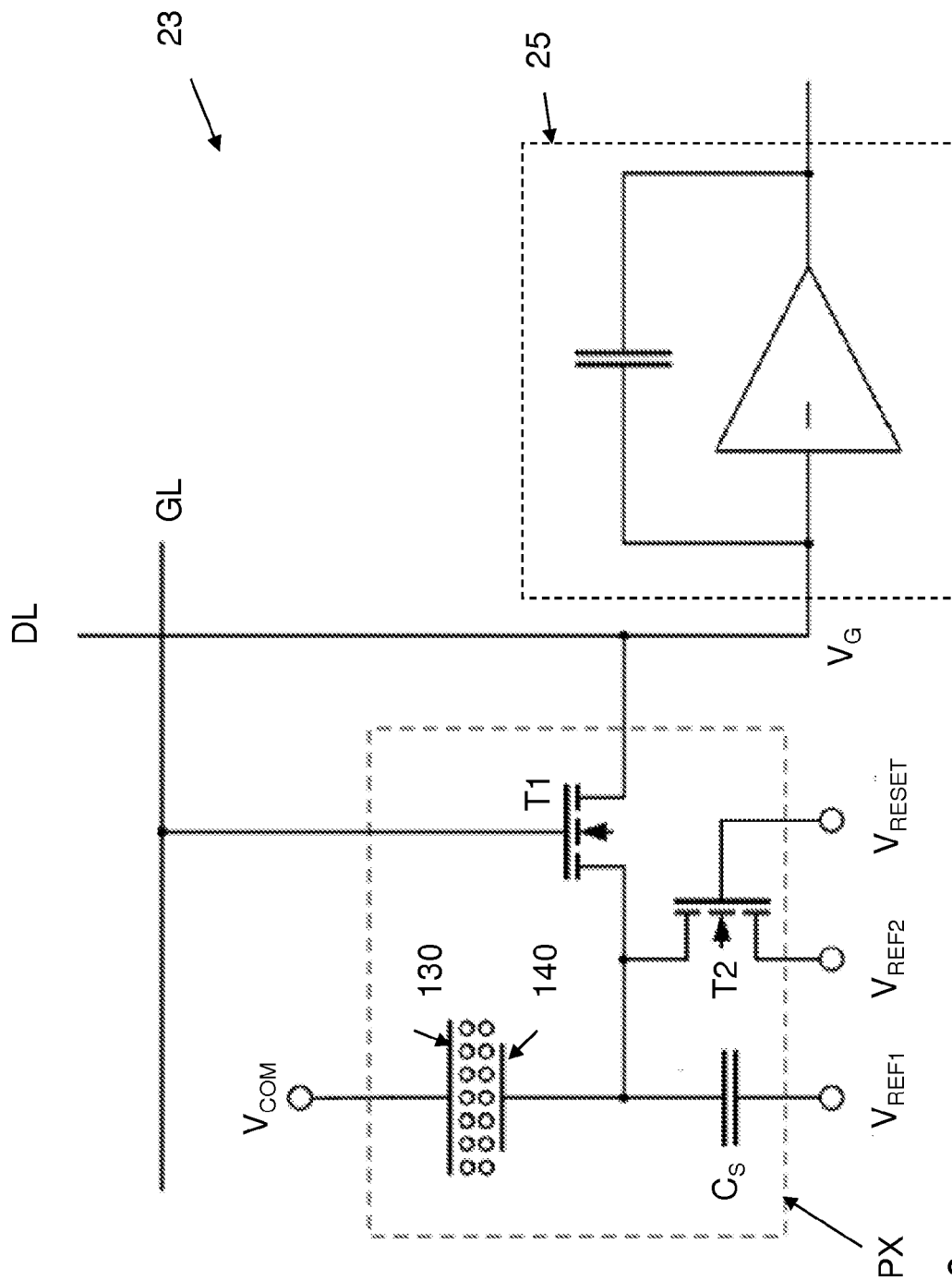

In the X-ray imager 23 illustrated in FIG. 10, the pixel PX may include a switching element T1, a switching element T2, and a storage capacitor $C_S$. The switching element T1 is configured to selectively couple the bottom electrodes 140 to virtual ground $V_G$ via the data line DL according to the voltage level of the scan line GL. The switching element T2 is configured to selectively couple the bottom electrode 140 to a bias voltage $V_{REF2}$ according to a reset voltage $V_{RESET}$. The storage capacitor $C_S$ is coupled between the bottom electrodes 140 and a bias voltage $V_{REF1}$. The charges induced by the charge carriers, generated within the X-ray sensitive particles of the pixel PX during an X-ray exposure, may be collected by the storage capacitor Cs and transferred to the amplifying circuit 25 via the switching element T1 and the data line DL when the scan line GL is selected. The status of the pixel PX may be reset via the switching element T2 for measuring another X-ray exposure.

Figure 11:
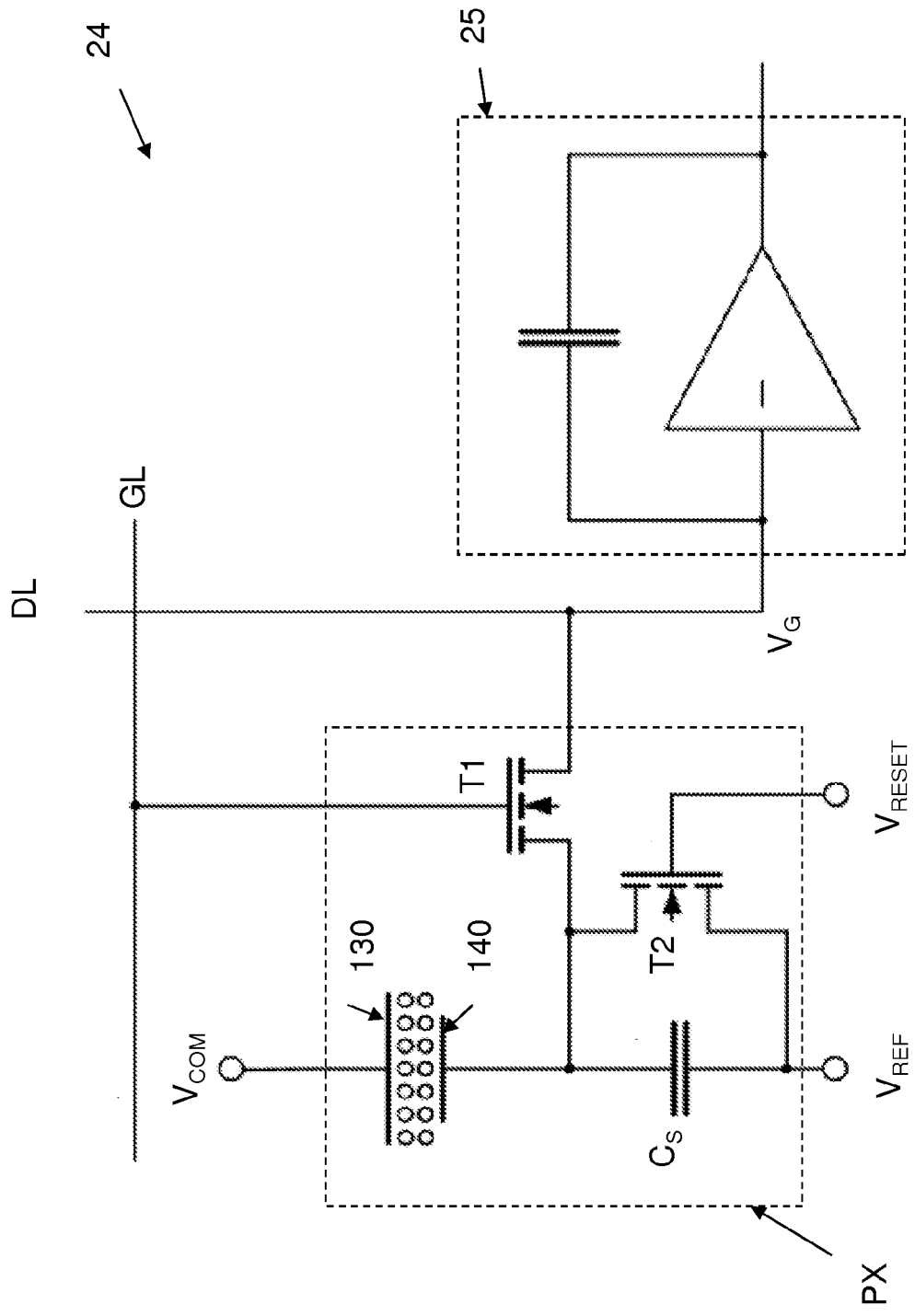

In the X-ray imager 24 illustrated in FIG. 11, the pixel PX may include a switching element T1, a switching element T2, and a storage capacitor $C_S$. The switching element T1 may be configured to selectively couple the bottom electrodes 140 to the virtual ground $V_G$ via the data line DL according to the voltage level of the scan line GL. The switching element T2 may be configured to selectively couple the bottom electrode 140 to a bias voltage $V_{REF}$ according to a reset voltage $V_{RESET}$. The storage capacitor $C_S$ may be coupled between the bottom electrodes 140 and the bias voltage $V_{REF}$. The charges induced by the charge carriers, generated within the X-ray sensitive particles of the pixel PX during an X-ray exposure, may be collected by the storage capacitor Cs and transferred to the amplifying circuit 25 via the switching element T1 and the data line DL when the scan line GL is selected. The status of the pixel PX may be reset via the switching element T2 for measuring another X-ray exposure.

In the embodiments illustrated in FIGS. 8-11, the switching element T1 or T2 may be, but not limited to, a thin film transistor (TFT) switch, or another type of device having similar function.

Figure 12:
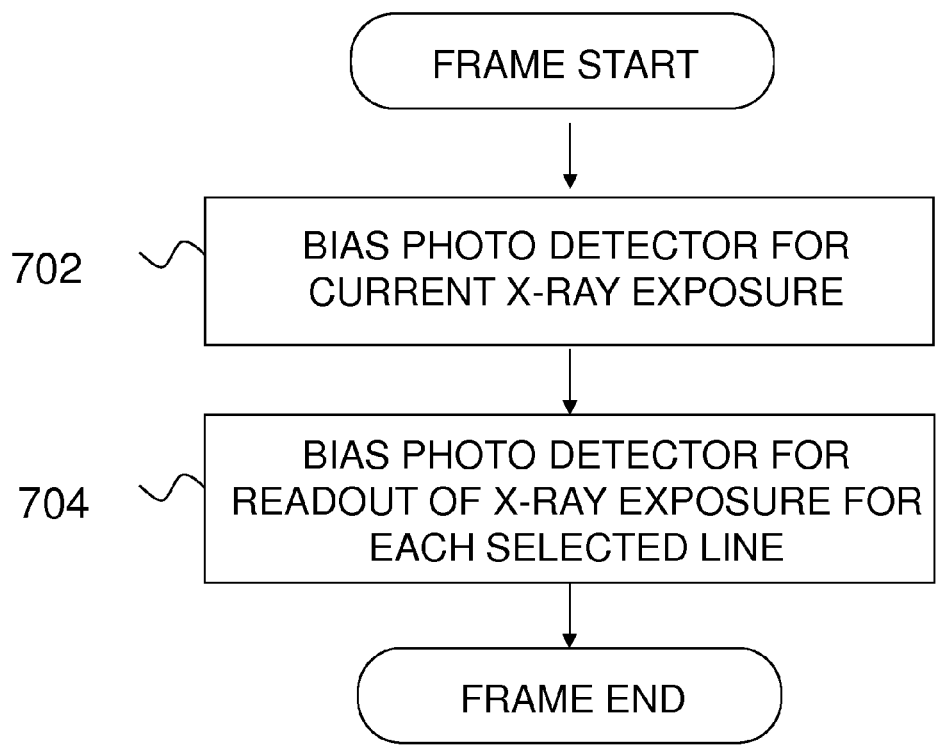
FIG. 12 is a flowchart of an illustrative embodiment of a method for operating an X-ray imager.
Figure 13:
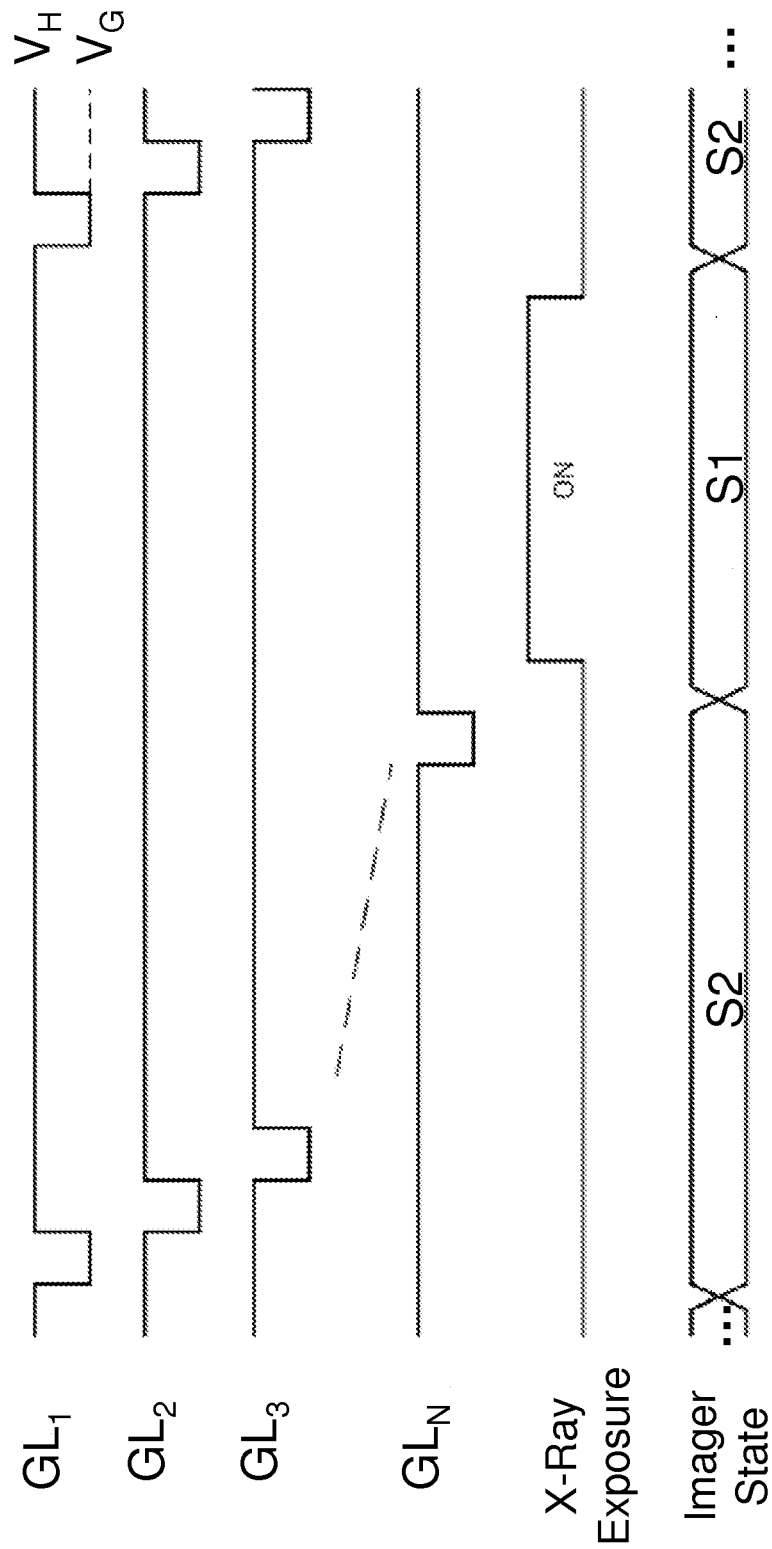
FIGS. 13-14 are timing diagrams illustrating various implementations of the method shown in FIG. 12.
Figure 14:
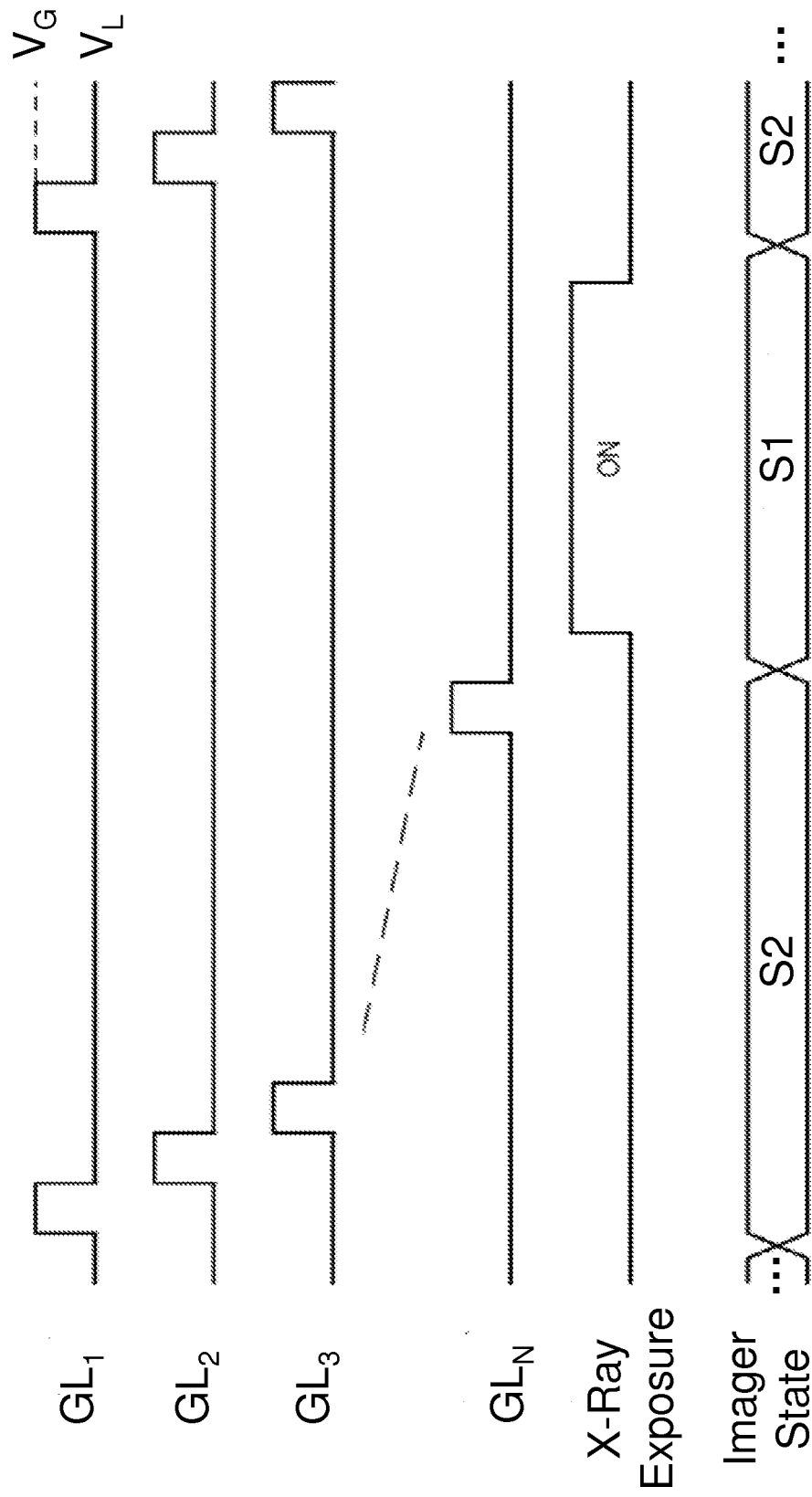

FIG. 12 is a flowchart of an illustrative embodiment of a method 700 for operating the X-ray imager 10. FIGS. 13-14 are timing diagrams illustrating various implementations of method 700. Method 700 may include one or more operations, functions or actions as illustrated by one or more of blocks 702, and/or 704. The various blocks may be combined into fewer blocks, divided into additional blocks, and/or eliminated based upon the desired implementation. Processing for method 700 may begin at block 702, "bias photo detector for current X-ray exposure" after a frame start. Block 702 may be followed by block 704, "bias photo detector for readout of X-ray exposure for each selected line". Referring to FIGS. 12-14, the operations of an X-ray imager, such as the X-ray imager 10, according to method 700 may include two stages: X-ray exposure period S1 and readout period S2. During X-ray exposure periods S1 (e.g., when processing block 702 of method 700), the scan lines (represented by $GL_1$-$GL_N$) may be biased at a predetermined level, such as at $V_H$ ($V_H > V_G$) in FIG. 12 or $V_L$ ($V_L < V_G$) in FIG. 13. Upon absorption of X-ray photons, the generated charge carriers may be confined within the X-ray sensitive particles, as depicted in FIGS. 1-5.

During readout periods S2 (e.g., when processing block 704 of method 700), corresponding rows of pixels may be selected by applying voltage pulses, such as by sequentially applying a voltage drop ($V_H$-$V_G$) to the scan lines $GL_1$-$GL_N$ as shown in FIG. 13, or by sequentially applying a voltage surge ($V_G$-$V_L$) to the scan lines $GL_1$-$GL_N$ as shown in FIG. 14. In other words, the external field established across the photo detector at each pixel location may be reduced to zero, which may allow the generated charge carriers to recombine. The induced capacitive current at the corresponding data lines may thus be transferred to the amplifying circuit 25 for subsequent readout.

Figure 15:
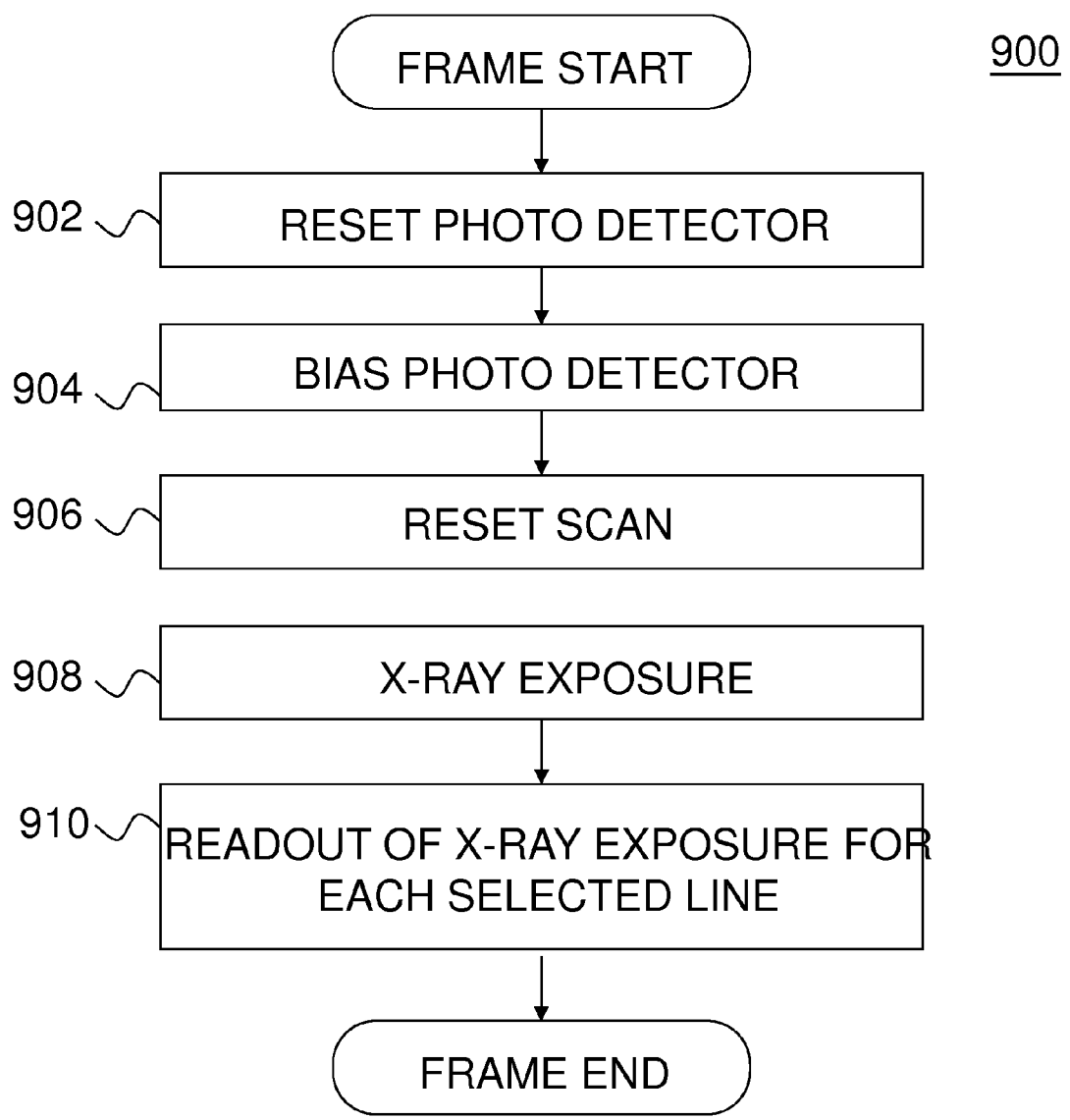
FIG. 15 is a flowchart of another illustrative embodiment of a method for operating an X-ray imager.
Figure 16:
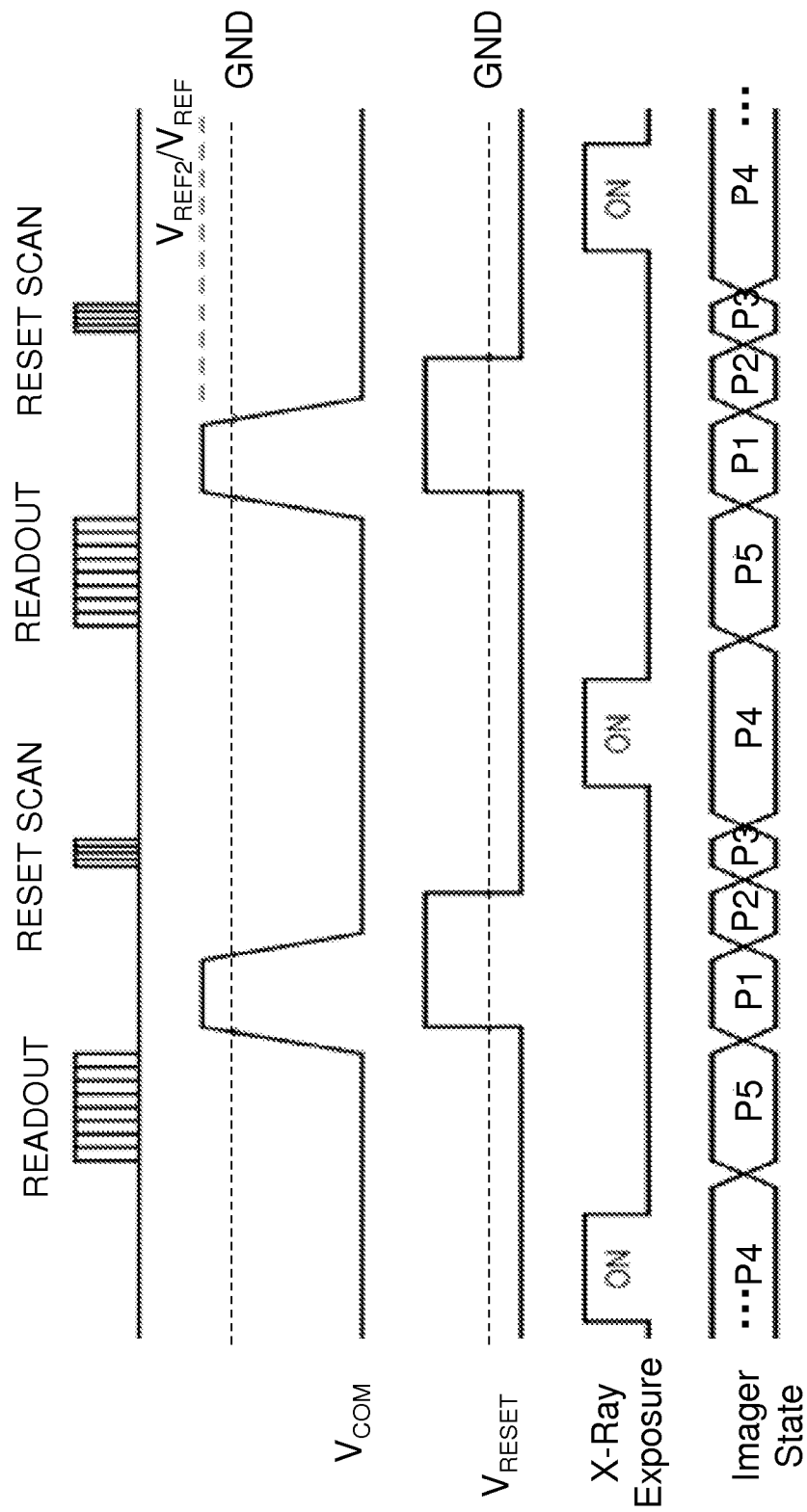
FIG. 16 is a timing diagram illustrating an implementation of the method shown in FIG. 15, all arranged in accordance with at least some embodiments of the present disclosure.

FIG. 15 is a flowchart of an illustrative embodiment of a method 900 for operating the X-ray imagers 22-24. FIG. 16 is a timing diagram illustrating an implementation of method 900. Method 900 may include one or more operations, functions or actions as illustrated by one or more of blocks 902, 904, 906, 908 and/or 910. The various blocks may be combined into fewer blocks, divided into additional blocks, and/or eliminated based upon the desired implementation. Processing for method 900 may begin at block 902, "reset photo detector" after a frame starts. Block 902 may be followed by block 904, "bias photo detector". Block 904 may be followed by block 906, "reset scan". Block 906 may be followed by block 908, "X-ray exposure". Block 908 may be followed by block 910, "readout of X-ray exposure for each selected line".

Referring to FIGS. 15 and 16, the operations of the X-ray imager 22-24 according to method 900 may include five stages: reset period P1, bias period P2, reset scan period P3, X-ray exposure period P4, and readout period P5. During reset periods P1 when processing for method 900 at block 902, the voltage $V_{COM}$ is set to $V_{REF}$ (FIG. 9 or 11) or $V_{REF2}$ (FIG. 10). Meanwhile, the reset voltage $V_{RESET}$ is set to an enable level (such as a level higher than ground GND for an N-type switching element T2), thereby turning on the switching element T2. In other words, both sides of the photo detector are coupled to the same voltage $V_{REF}$ or $V_{REF2}$ for resetting the photo detector after the previous X-ray exposure.

During bias periods P2 (e.g., when processing block 904 of method 900), the voltage $V_{COM}$ may be set to a level lower than $V_{REF}$ (FIG. 9 or 11) or lower than $V_{REF2}$ (FIG. 10). This may create an external field across the photo detector.

During reset scan periods P3 (e.g., when processing block 906 of method 900), the voltage $V_{COM}$ may be set to a level lower than $V_{REF}$ (FIG. 9 or 11) or $V_{REF2}$ (FIG. 10), while the reset voltage may be set to a disable level (such as a level lower than ground GND for an N-type switching element T2). During periods P3, the pixels are being read out but the data are not being processed. Thus, the pixels may be discharged quickly.

Upon absorption of X-ray photons during X-ray exposure periods P4 (e.g., when processing block 908 of method 900), the generated charge carriers may be drawn to opposite sides of the X-ray sensitive particles and confined within the X-ray sensitive particles, as depicted in FIGS. 1-5.

During readout periods P5 (e.g., when processing block 910 of method 900), corresponding rows of pixels may be selected by sequentially applying a voltage pulse to the scan lines $GL_1$-$GL_N$.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

I claim:

1. An X-ray imager, comprising:
   a photo detector having a plurality of X-ray sensitive particles that are configured to be electrically isolated and to generate charge carriers upon absorption of X-ray photons, wherein the generated charge carriers are confined within the X-ray sensitive particles;
   a layer within which the plurality of X-ray sensitive particles are distributed;
   a pixel array in which each pixel is defined by a space between a first surface and a second surface of the layer;
   a scan line for activating a corresponding row of the pixels in the pixel array; and
   a data line for reading data from a corresponding column of the pixels in the pixel array.

2. The X-ray imager of claim 1, wherein the layer is made of an electrically isolating material.

3. The X-ray imager of claim 2, wherein each of the plurality of X-ray sensitive particles is coated with an electrically isolating film.

4. The X-ray imager of claim 2, wherein the plurality of X-ray sensitive particles have varying sizes.

5. The X-ray imager of claim 2, wherein the plurality of X-ray sensitive particles have varying densities in a direction of incident X-ray photons.

6. The X-ray imager of claim 2, wherein the layer further includes an electrically isolating structure to divide the layer into multiple portions, in which the plurality of X-ray sensitive particles are disposed.

7. The X-ray imager of claim 2, wherein the layer and the plurality of X-ray sensitive particles have different dielectric constants.

8. The X-ray imager of claim 2, wherein the layer includes a binder material for binding the X-ray sensitive particles to form a composite particle-in-isolating-binder material.

9. The X-ray imager of claim 2, wherein:
   the scan line is provided on the first surface of the layer; and
   the data line is provided on the second surface of the layer opposite to the first surface.

10. The X-ray imager of claim 9, wherein the scan line is configured to be substantially orthogonal to the data line.

11. The X-ray imager of claim 2, further comprising:
    pixel electrodes provided on a same side of the layer on which the scan line and the data line are disposed;
    a common electrode provided on a surface of the layer; and
    a first switching element for selectively coupling a corresponding pixel electrode to the data line according to a signal received from the scan line.

12. The X-ray imager of claim 11, further comprising a storage capacitor coupled to the corresponding pixel electrode.

13. The X-ray imager of claim 11, further comprising a second switching element for selectively coupling the corresponding pixel electrode to a constant voltage when resetting and biasing the photo detector.

14. The X-ray imager of claim 13, further comprising a storage capacitor coupled to the corresponding pixel electrode.

15. The X-ray imager of claim 14, wherein the second switching element is coupled in parallel to the storage capacitor.

16. The X-ray imager of claim 1, wherein the plurality of X-ray sensitive particles are pre-treated to reduce charge trapping bonds on surfaces of the X-ray sensitive particles.

17. The X-ray imager of claim 1, further comprising a charge amplifier coupled to the data line for measuring an amount of the charge carriers released in the X-ray sensitive particles.

18. A method for measuring an X-ray exposure, comprising:
    applying an external electrical field to a photo detector having a layer of an electrically isolating material and X-ray sensitive particles distributed within the layer; and
    reading out charges induced by an internal electrical field for determining an amount of the X-ray exposure, wherein the internal electrical field is established when electrons and holes of charge carriers generated and confined within the X-ray sensitive particles during the X-ray exposure are drawn to opposite sides of the X-ray sensitive particles by the external electrical field.

19. The method of claim 18, further comprising resetting the photo detector to a predetermined bias state after reading out the charges.

20. The method of claim 19, further comprising resetting the photo detector to the predetermined bias state by removing or reversing the external electrical field.

21. The method of claim 18, further comprising reversing the external electrical field to discharge the charges before the X-ray exposure.

* * * * *